Patented Apr. 27, 1943

2,317,696

UNITED STATES PATENT OFFICE 2,317,696

PROCESS FOR IMPARTING GREASEPROOF CHARACTERISTICS TO PAPER

Edward D. Rich, Tacoma, Wash.

No Drawing. Application May 13, 1942, Serial No. 442,852

1 Claim. (Cl. 117—86)

The present invention has for its object the production of a paper which has grease resistant or greaseproof properties.

In general the invention consists in coating a sheet of paper suitable for writing, printing or wrapping with certain liquid coating compositions whereby the paper is rendered grease resistant or greaseproof.

According to the invention, a common sheet or piece of paper, such as is suitable for writing, or wrapping, or printing, is coated with two liquid coating compositions, each consisting of the different water solutions hereinafter mentioned. After application of the first coating composition, but before the application of the second coating, the first coating and the paper is dried. After application of the second coating similar drying is effected. The first coating which is applied is in the nature of a size to prepare the paper to receive the second coating.

The first liquid coating composition which is applied to the sheet of paper consists of a water solution containing 5 to 20 per cent, by weight, of a chlorinated or other reduced viscosity starch, one to ten per cent, by weight, of glycerine as a plasticizer and 0.5 to two per cent, by weight, of a methyl cellulose (methyl ether of cellulose) which is soluble in water. After the sheet of paper is coated with this composition it is dried and then coated, on the same side, with a water solution containing one to ten per cent, by weight, of a methyl cellulose (methyl ether of cellulose) which is soluble in water and one to five per cent, by weight, of glycerine. The paper is then dried. The resulting sheet of paper shows greaseproof characteristics by resisting the penetration of turpentine in the standard turpentine test for four minutes or more.

The chlorinated or other reduced viscosity starches referred to above are well known forms of starches made for example by treating corn, potato, tapioca or other starch with chlorine or an acid to reduce the molecular chain length of the starch molecule and to reduce the viscosity of the starch in water solution. Starches reduced in viscosity by enzyme action are also useful in practicing the invention. By the expression "reduced viscosity starch" appearing in the claim I intend to include all starches which have had their viscosity reduced by any treatment whatsoever. Reduced viscosity starches which in 5%, by weight, solution in water give at 20° C. a viscosity of 15 to 50 centipoises, measured by the falling ball method using Stokes' law for conversion, give excellent results when used in practicing the present invention.

The methyl esters of cellulose which are employed in the above liquid coating compositions are of the type that are soluble in water. Methyl ethers of cellulose having 1.0 to 2.0 methoxyl ($OCH_3$) groups per $C_6H_{10}O_5$ unit have sufficient water solubility for the purposes of the present invention.

Usually, I prefer to employ the same type of methyl ether of cellulose in the two coating compositions. However, water soluble methyl ethers of cellulose of different types, or of different viscosity ranges, may be employed in the two solutions.

I claim:

Process for imparting greaseproof characteristics to paper which comprises coating paper first with a water solution containing 5 to 20%, by weight, of a reduced viscosity starch, 1.0 to 10.0%, by weight, of glycerine, and 0.5 to 2%, by weight of a methyl ether of cellulose which is soluble in water; thereafter drying the paper, applying on the same side of the paper a water solution containing 1 to 10%, by weight, of a methyl ether of cellulose which is soluble in water and 1.0 to 5%, by weight, of glycerine; and thereafter drying the paper.

EDWARD D. RICH.